United States Patent
Wei et al.

(10) Patent No.: US 8,401,861 B2
(45) Date of Patent: Mar. 19, 2013

(54) GENERATING A FREQUENCY WARPING FUNCTION BASED ON PHONEME AND CONTEXT

(75) Inventors: Shuang Zhi Wei, Beijing (CN); Raimo Bakis, Briarcliff Manor, NY (US); Ellen Marie Eide, New York, NY (US); Liqin Shen, Beijing (CN)

(73) Assignee: Nuance Communications, Inc., Burlington, MA (US)

( * ) Notice: Subject to any disclaimer, the term of this patent is extended or adjusted under 35 U.S.C. 154(b) by 1081 days.

(21) Appl. No.: 11/654,447

(22) Filed: Jan. 17, 2007

(65) Prior Publication Data

US 2007/0185715 A1 Aug. 9, 2007

(30) Foreign Application Priority Data

Jan. 17, 2006 (CN) .......................... 2006 1 0001466

(51) Int. Cl.
*G10L 21/00* (2006.01)
*G10L 13/06* (2006.01)

(52) U.S. Cl. ........................................ 704/278; 704/254
(58) Field of Classification Search .................. 704/234, 704/238, 239, 250, 254, 255
See application file for complete search history.

(56) References Cited

U.S. PATENT DOCUMENTS

| | | | | |
|---|---|---|---|---|
| 5,327,521 A * | 7/1994 | Savic et al. | .................... | 704/272 |
| 6,236,963 B1 * | 5/2001 | Naito et al. | .................... | 704/241 |
| 6,332,121 B1 * | 12/2001 | Kagoshima et al. | .......... | 704/262 |
| 6,336,092 B1 * | 1/2002 | Gibson et al. | ................. | 704/268 |
| 6,553,343 B1 * | 4/2003 | Kagoshima et al. | .......... | 704/262 |
| 6,618,699 B1 * | 9/2003 | Lee et al. | ...................... | 704/209 |
| 6,760,703 B2 * | 7/2004 | Kagoshima et al. | .......... | 704/262 |
| 7,184,958 B2 * | 2/2007 | Kagoshima et al. | .......... | 704/260 |
| 7,209,882 B1 * | 4/2007 | Cosatto et al. | ................ | 704/235 |
| 7,464,034 B2 * | 12/2008 | Kawashima et al. | .......... | 704/266 |
| 7,716,052 B2 * | 5/2010 | Aaron et al. | .................. | 704/258 |
| 2001/0021904 A1 * | 9/2001 | Plumpe | ......................... | 704/209 |
| 2002/0065649 A1 * | 5/2002 | Kim | ............................. | 704/219 |
| 2003/0028380 A1 * | 2/2003 | Freeland et al. | ............. | 704/260 |
| 2005/0065784 A1 * | 3/2005 | McAulay et al. | ............. | 704/205 |
| 2005/0094821 A1 * | 5/2005 | Bharitkar et al. | ............... | 381/17 |
| 2006/0212296 A1 * | 9/2006 | Espy-Wilson et al. | ........ | 704/254 |
| 2006/0259303 A1 * | 11/2006 | Bakis | ............................ | 704/268 |
| 2007/0233489 A1 * | 10/2007 | Hirose et al. | .................. | 704/258 |

OTHER PUBLICATIONS

Umesh et al. Frequency Warping and the Mel Scale, Mar. 2001, IEEE Signal Processing Letters, vol. 9, No. 3, pp. 104-107.*

(Continued)

*Primary Examiner* — Talivaldis Ivars Smits
(74) *Attorney, Agent, or Firm* — Wolf, Greenfield & Sacks, P.C.

(57) ABSTRACT

A method for generating a frequency warping function comprising preparing the training speech of a source and a target speaker; performing frame alignment on the training speech of the speakers; selecting aligned frames from the frame-aligned training speech of the speakers; extracting corresponding sets of formant parameters from the selected aligned frames; and generating a frequency warping function based on the corresponding sets of formant parameters. The step of selecting aligned frames preferably selects a pair of aligned frames in the middle of the same or similar frame-aligned phonemes with the same or similar contexts in the speech of the source speaker and target speaker. The step of generating a frequency warping function preferably uses the various pairs of corresponding formant parameters in the corresponding sets of formant parameters as key positions in a piecewise linear frequency warping function to generate the frequency warping function.

31 Claims, 7 Drawing Sheets

OTHER PUBLICATIONS

Seide et al. Coarticulation Modeling by Embedding a Target-Directed Hidden Trajectory Model Into HMM—Map Decoding and Evaluation, 2003, ICASSP.*

Lee et al. A Frequency Warping Approach to Speaker Normalization, 1998, IEEE.*

Pitz et al. Vocal Tract Normalization as Linear Transformation of MFCC, 2003, Citeseer.*

Beautemps et al. Deriving vocal-tract area functions from midsagittal profiles and formant frequencies: A new model for vowels and fricative consonants based on experimental data, 1995, Speech Communication 16, pp. 27-47.*

Eide et al. A Parametric Approach to Vocal Tract Length Normalization, 1996, IEEE, pp. 346-348.*

Gao et al. Multistage Coarticulation Model Combining Articulatory, Formant and Cepstral Features, Oct. 2000, ICSLP.*

Zhan et al. Speaker Normalization Based on Frequency Warping, Apr. 1007, ICASSP.*

Sundermann et al, A first step towards text-independent voice conversion, Oct. 4-8, 2004, INTERSPEECH-2004, pp. 1173-1176.*

Tomoki Toda et al. "Voice Conversion Algorithm Based on Gaussian Mixture Model With Dynamic Frequency Warping of Straight Spectrum", IEEE ICASSP May 2001.*

Zhiwei Shuang et al. "Voice Conversion Based on Mapping Formants", TC-STAR Workshop on Speech-to-Speech Translation, Jun. 2006.*

Eide et al., "A Parametric Approach to Vocal Tract Length Normalization," 1996 IEEE International Conference on Acoustics, Speech, and Signal Processing, 1996, ICASSP-96, vol. 1, pp. 346-348.

Gouvea et al., "Speaker Normalization Through Format-Based Warping of the Frequency Scale," Proc. European Conf. on Speech Communication and Technology, vol. III, pp. 1139-1142, Rhodes, Greece, Sep. 1997.

Lee, "Speaker normalization using efficient frequency warping procedures," 1996 IEEE International Conference on Acoustics, Speech, and Signal Processing, 1996, ICASSP-96, vol. 1, pp. 353-356.

Zhan et al., "Speaker Normalization Based on Frequency Warping," 1997 IEEE International Conference on Acoustics, Speech, and Signal Processing, 1997. ICASSP-97, vol. 2, pp. 1039-1042.

* cited by examiner

GENERATING A FREQUENCY WARPING FUNCTION BASED ON PHONEME AND CONTEXT

TECHNICAL FIELD

The present invention relates to the fields of voice conversion and speech recognition, more specifically to a method and apparatus for frequency warping, and even more specifically to a method and apparatus for generating a frequency warping function.

BACKGROUND OF THE INVENTION

Frequency warping, a special case of which is Vocal Tract Length Normalization (VTLN), is a well-studied method for compensating for the differences between the acoustic spectra of different speakers. It is widely used in speech recognition and voice conversion. Given a spectral cross section of one sound, the method creates a new spectral cross section by applying a frequency warping function. For speech recognition, the new cross section may directly serve as input to the recognition algorithms. In other applications, a new, modified sound may be needed. For example, in applications such as on-line game chatting, call centers, multimedia message services, etc., the frequency warping may be needed to perform the speaker identity conversion to make the voice of one speaker sound like that of another speaker. So, the original sound can be modified, for example by means of a linear filter, or a new sound may be synthesized, for example as a sum of sinusoids, to conform to the new spectral cross section.

Many automatic training methods for finding a good frequency warping function have been proposed in the prior art. One is the Maximum Likelihood Linear Regression method. A description of this method can be found in an article by L. F. Uebel, and P. C. Woodland", entitled "An investigation into vocal tract length normalization," EUROSPEECH' 99, Budapest, Hungary, 1999, pp. 2527-2530. However, this method requires a large amount of training data, which limits its usefulness in many applications. Another method is to use linear or piecewise linear warping functions, and to use dynamic programming to train the warping function by minimizing the distance between the converted source spectrum and the target spectrum. A description of this method can be found in an article by David Sundermann and Hermann Ney, "VTLN-Based Voice Conversion", ICSLP, 2004, Jeju, Korea, 2004. However, few published frequency warping systems are actually based on this method because the results can be seriously degraded by noise in the input spectra.

In view of the shortcomings of the above methods, another kind of frequency warping method has been proposed that utilizes the acoustic features of the voices of speakers. Specifically, a frequency warping function is obtained based on the formant relations between the source speaker and target speaker. Formants refer to several frequency regions with higher sound intensities formed in the sound spectrum during speech due to the resonance of the vocal tract itself. Formants are related to the shape of the vocal tract, therefore each person has different formants. The matching formants between different speakers can demonstrate the difference between the different speakers.

The prior art methods for obtaining a frequency warping function by using formants typically use statistic methods to extract some statistical averages of some formant frequencies from the training speech data of the source speaker and target speaker respectively, and derive the frequency warping function based on the relationship between the statistical values of the formant frequencies of the source speaker and target speaker. This method can be seen in E. B. Gouvea and R. M. Stern, "Speaker Normalization Through Formant-Based Warping of the Frequency Scale", 5th EUROSPEECH, Volume 3, September 1997, pages 1139-1142, and E. Eide and H. Gish, "A parametric approach to vocal tract length normalization", Proceedings of ICASSP' 96, Atlanta, USA, 1996, 312. Considering that the formants of different phonemes uttered by the same speaker are different, there is proposed an improved method for deriving a frequency warping function by using the formants of the same phonemes to produce the matching formants, in order to reflect the difference between the different speakers.

However, because the formants and their relations with the vocal tract length (VTL) are not only dependent on the vocal tract shape of the speaker and the different phonemes uttered by the speaker, but also highly dependent on the context, the formants of the same speaker may vary significantly in different contexts. Therefore, this method of extracting formant parameters by mixing up phonemes in different contexts, though using a large amount of training data, cannot reflect the difference between the actual speech organs of the speakers, and naturally its effect is not satisfactory.

There exists a need for a new method for generating a good frequency warping function which uses a small amount of training data and which overcomes the shortcomings in the prior art.

SUMMARY OF THE INVENTION

In view of the above shortcomings in the prior art, the object of the invention is to provide a method for generating a good frequency warping function by using a small amount of training data, wherein the frequency warping function reflects the relationship between the different acoustic features produced due to the difference between the vocal tract shapes of the source speaker and target speaker. The generated frequency warping function is used to convert the voice of the source speaker into the voice of the target speaker successfully, for various applications of voice conversion and speech recognition.

According to an aspect of the present invention, there is provided a method for generating a frequency warping function, the method comprising: preparing the training speech of a source speaker and target speaker; performing frame alignment on the training speech of the source speaker and target speaker; selecting aligned frames from the frame-aligned training speech of the source speaker and target speaker; extracting corresponding sets of formant parameters from the selected aligned frames; and generating a frequency warping function based on the corresponding sets of formant parameters.

Preferably, the formant parameters are formant frequencies.

Preferably, the step of generating a frequency warping function comprises using the various pairs of corresponding formant parameters in the corresponding sets of formant parameters as key positions in a piecewise linear frequency warping function to generate the frequency warping function.

Preferably, the step of performing frame alignment comprises: selecting corresponding occurrences from the training speech of the source speaker and target speaker; and performing frame alignment on the corresponding occurrences; wherein the corresponding occurrences are the same or similar phonemes with the same or similar contexts in the training speech of the source speaker and target speaker.

Preferably, the preparation step comprises preparing the training speech of the source speaker and target speaker with the same contents; and the step of performing frame alignment comprises using the Dynamic Time Warping (DTW) algorithm to perform frame alignment on the training speech of the source speaker and target speaker with the same contents.

Preferably, the step of selecting aligned frames comprises one or more of the following: selecting from the phonemes with the formant parameters of less variance, selecting from the phonemes with "plosives", "fricatives" or "silence" as their neighboring phonemes, selecting from the middle portion of the phonemes, and selecting the aligned frames with the minimal acoustic dissimilarity.

Preferably, the step of selecting aligned frames comprises the following steps: assigning respective costs to each pair of aligned frames in the training speech of the source speaker and target speaker based on the phonemes to which the pair of frames belong, the contexts of the pair of frames, the positions of the pair of frames in their phonemes, the acoustic dissimilarity between the pair of frames, respectively; calculating the weighted sum of the respective costs of the each pair of frames to obtain the total cost of the each pair of frames; and selecting the pair of frames with the minimal total cost as said aligned frames for extracting the corresponding sets of formant parameters.

According to another aspect of the present invention, there is provided an apparatus for generating a frequency warping function, the apparatus comprising: preparation means for preparing the training speech of a source speaker and target speaker; alignment means for performing frame alignment on the training speech of the source speaker and target speaker; selection means for selecting aligned frames from the frame-aligned training speech of the source speaker and target speaker; extraction means for extracting the corresponding sets of formant parameters from the selected aligned frames; and generating means for generating a frequency warping function based on the corresponding sets of formant parameters.

According to yet another aspect of the present invention, there is provided a method and apparatus for frequency warping by using a frequency warping function generated by the above method.

According to still another aspect of the present invention, there is provided a voice conversion method and system using the above method for frequency warping, and a speech recognition method and system using the above method for frequency warping.

A small amount of training data, in fact the training data of a single phoneme provided the contexts are the same or similar, is sufficient to obtain a pair of matching frames; and the formant parameters extracted from the stable portions with the same or similar contexts can better represent the difference between different people and produce a better frequency warping function.

BRIEF DESCRIPTION OF THE DRAWINGS

The present invention can be better understood by reading the following description of embodiments of the present invention with reference to the drawings, in which.

DETAILED DESCRIPTION OF THE INVENTION

A frequency warping function for frequency warping attempts to reflect the differences and relations between the features such as the vocal tract lengths and shapes of two speakers through the differences and relations between the spectral features such as the formant parameters of the speech of the speakers. The prior art methods in which the formant parameters in different contexts in a large amount of speech data of each speaker are mixed up to compute their statistical average values could not reflect the difference between the vocal tracts of different speakers. Further, the quality of a frequency warping function does not depend on the amount of the training data, but depends on the quality of the training data. The present invention generates a frequency warping function based on the formant parameters of a pair of aligned frames in the speech of a source speaker and a target speaker. Using the generated frequency warping function, the speech of the source speaker can be converted into speech similar to that of the target speaker.

Figure 1:
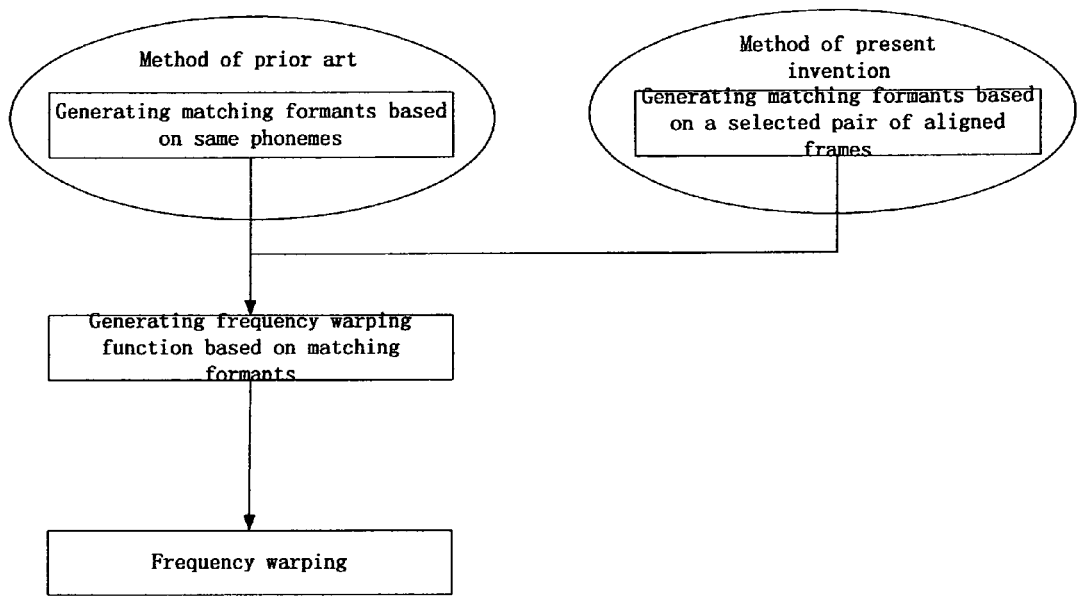
FIG. 1 schematically illustrates the differences between the method of the present invention and that of the prior art.

FIG. 1 illustrates the main differences between the method of the present invention and the method of the prior art. From the figure, it can be seen that the main differences lie in the different manners of generating the formants. In the closest prior art, the same phonemes in the training speech of the source speaker and target speaker are used to generate the matching formants, without considering the contexts where these phonemes are and the differences between the stable parts and transitional parts of the phonemes. The average values of the formants are derived from the numerous occurrences of the same phonemes in the training speech, and in the meantime, the formants of the source speaker and target speaker are obtained independently of each other. In contrast, the method of the present invention is to use a pair of aligned frames in the source and target training speech to generate the formant parameters, that is, the correspondence relationship of the formant parameters is based on the selected corresponding speech of the source speaker and target speaker.

Figure 2:
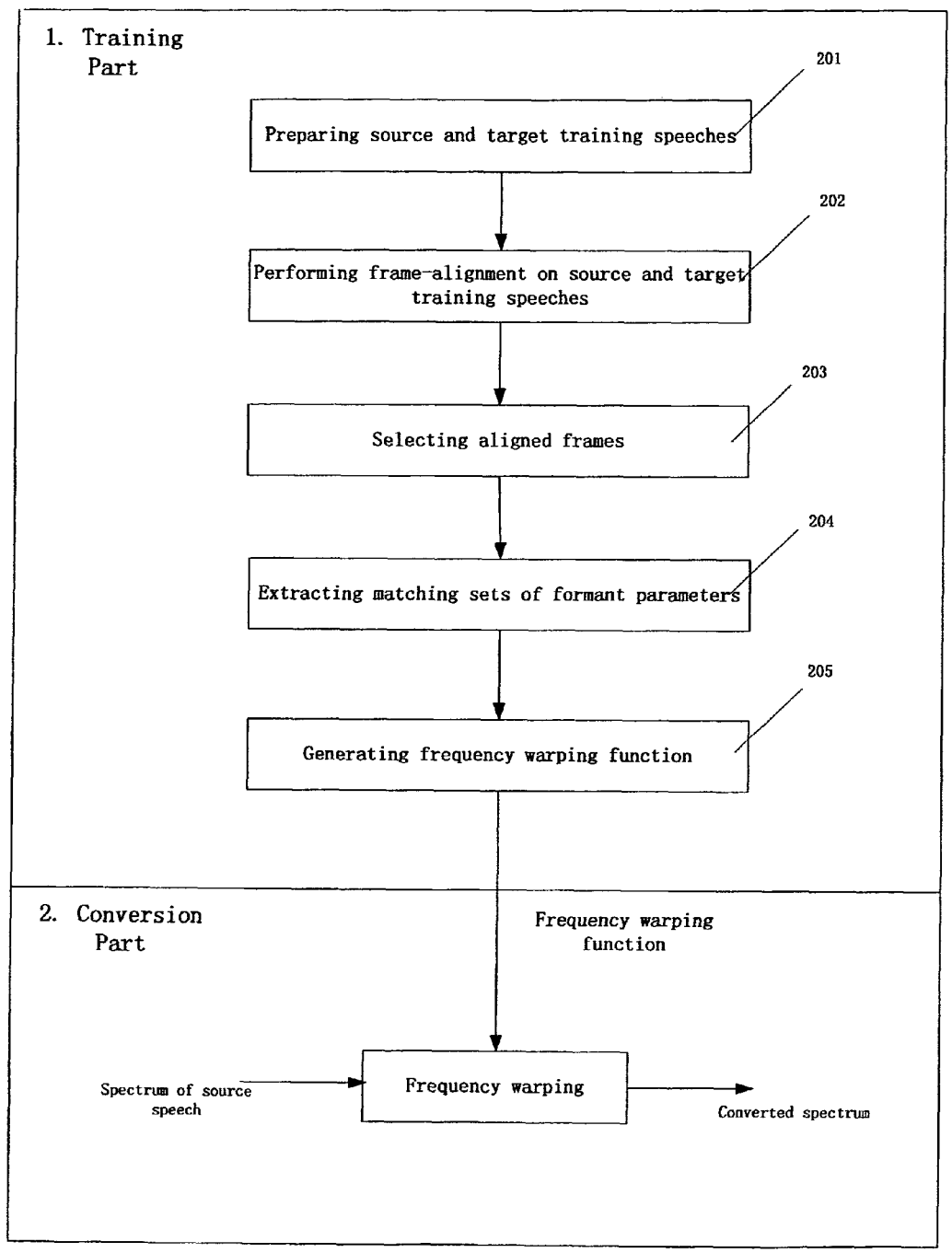
FIG. 2 illustrates a flow diagram of methods for generating a frequency warping function and for frequency warping according to a preferred embodiment of the present invention.

FIG. 2 illustrates a flow diagram of methods for generating a frequency warping function and for frequency warping according to a preferred embodiment of the present invention. As shown, the method of the invention consists of two parts, a training part and a conversion part. The training part serves to use the training speech of the source speaker and target speaker to train the system of the present invention, so as to generate a frequency warping function suitable for converting the speech of the source speaker into the speech similar to that of the target speaker. The conversion part serves to use the frequency warping function obtained from the training part to convert the speech from the source speaker.

In the following, a method for generating a frequency warping function according to the present invention will be described with reference to the training part of FIG. 2.

In step 201, the training speech of the source speaker and target speaker are prepared. The training speech can be prepared using various known methods, such as by recording, by extracting from audios, videos or other multimedia resources, etc. There may contain noise and music in the training speech. There is no limitation on the amount of the training speech, such that one sentence may be sufficient and, in practice, often just one phone uttered by the target speaker will do, provided that a frame matching with the speech of the source speaker can be extracted therefrom. The speech of the target speaker can be either an actual speech of a speaker, or the speech of a "standard speaker", that is, an average speech derived from the speech of numerous speakers. Depending on different embodiments, the training speech of the source speaker and target speaker can be required to be either the speech of the same contents uttered by the source speaker and target speaker, or the speech of different contents.

In step 202, the training speech of the source speaker and target speaker are frame-aligned. That is, the training speech of the source speaker and target speaker or parts thereof are divided into frames and some frames in the training speech of the source speaker and target speaker are aligned by using a method which will be described below in detail.

In step 203, the best aligned frames are selected from the aligned frames by using a method which will be described below in detail. Either a single pair of matching frames or multiple pairs of matching frames can be selected; and the multiple pairs of the matching frames can either belong to different phonemes or belong to the same phoneme.

In step 204, matching sets of formant parameters are obtained from the aligned frames. The matching sets of formant parameters can be extracted by using any of the known methods for extracting formant parameters from speech. The extraction of the formant parameters can be performed automatically or manually. One possible way is to use a certain speech analysis tool, such as PRAAT, to extract the formant parameters. When extracting the formant parameters of the aligned frames, the information of the adjacent frames can be used to make the extracted formant parameters more robust and reliable.

In one embodiment of the present invention, the formant parameter is formant frequency and the set of formant parameters are the first 4 formant frequencies. However, the formant parameter is not limited to formant frequency, but rather may include other formant parameters such as bandwidth, amplitude, etc. It can also include other parameters that define similar information, such as Q parameters.

In this step, either one pair of matching sets of formant parameters may be obtained from a pair of matching frames, or multiple pairs of matching sets of formant parameters may be obtained from multiple pairs of matching frames. In the case where multiple pairs are used, the average of the multiple pairs of matching sets of formant parameters may be calculated as one pair of matching sets of formant parameters. The multiple pairs of matching sets of formant parameters obtained from the multiple pairs of matching frames may also be provided directly to the next step.

In step 204, the obtained matching sets of formant parameters are used to generate a frequency warping function. In an embodiment of the present invention, various pairs of matching formant parameters in a pair of matching sets of formant parameters are used as the key positions to generate a frequency warping function.

In this step, one pair of matching sets of formant parameters may be used to generate one frequency warping function, which is to be used in the conversion part of the method of the present invention for converting all the speech of the source speaker, or multiple pairs of matching sets of formant parameters may be used to generate multiple frequency warping functions respectively, which are to be used in the conversion part of the method of the present invention for converting the respective phonemes in the speech of the source speaker. Further, multiple pairs of matching sets of formant parameters may be used to generate multiple frequency warping functions respectively, and the average of these multiple frequency warping functions may be calculated and used in the conversion part of the method of the present invention for converting the speech of the source speaker.

As an illustration, the formant parameters of the source speaker are noted as: [F1$s$, F2$s$, F3$s$, . . . Fn$s$], and the formant parameters of the target speaker are noted as: [F1$t$, F2$t$, F3$t$, . . . Fn$t$]. The mapping formants [Fi$t$, Fi$s$] will be used as the key positions to define a piecewise linear frequency warping function from the target frequency axis to the source frequency axis. Linear interpolation can be used to generate the parts between two adjacent key positions, but other interpolation schemes can also be used to generate these parts.

Suppose the speech of both speakers to have the same maximum frequency, noted as Fmax. To facilitate the interpolation outside the minimum and the maximum formant parameters in the sets of formant parameters, [0, 0] and [Fmax, Fmax] can be added as end points. However, other end points can be used.

Figure 3:
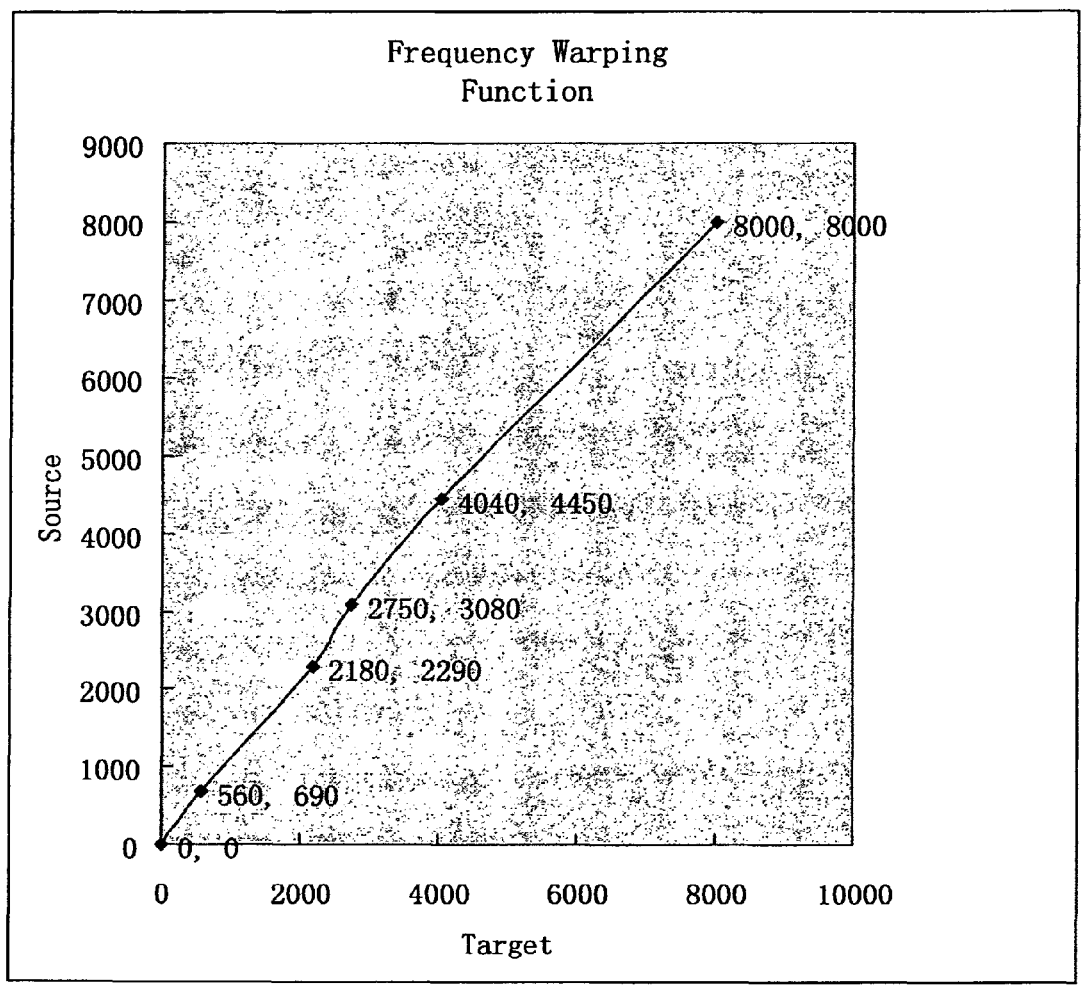
FIG. 3 illustrates an exemplary frequency warping function generated according to an embodiment of the present invention.

As an example, the first 4 formant parameters as follows are used: Source Speaker [690, 2290, 3080, 4450], Target Speaker [560, 2180, 2750, 4040]. The maximum frequency is 8000 for both speakers. Then the frequency warping function from the target frequency axis to the source frequency axis is as shown in FIG. 3.

In the following, several embodiments of the step 202 of frame alignment and the step 203 of selecting aligned frames of the present invention will be described in detail.

Figure 4:
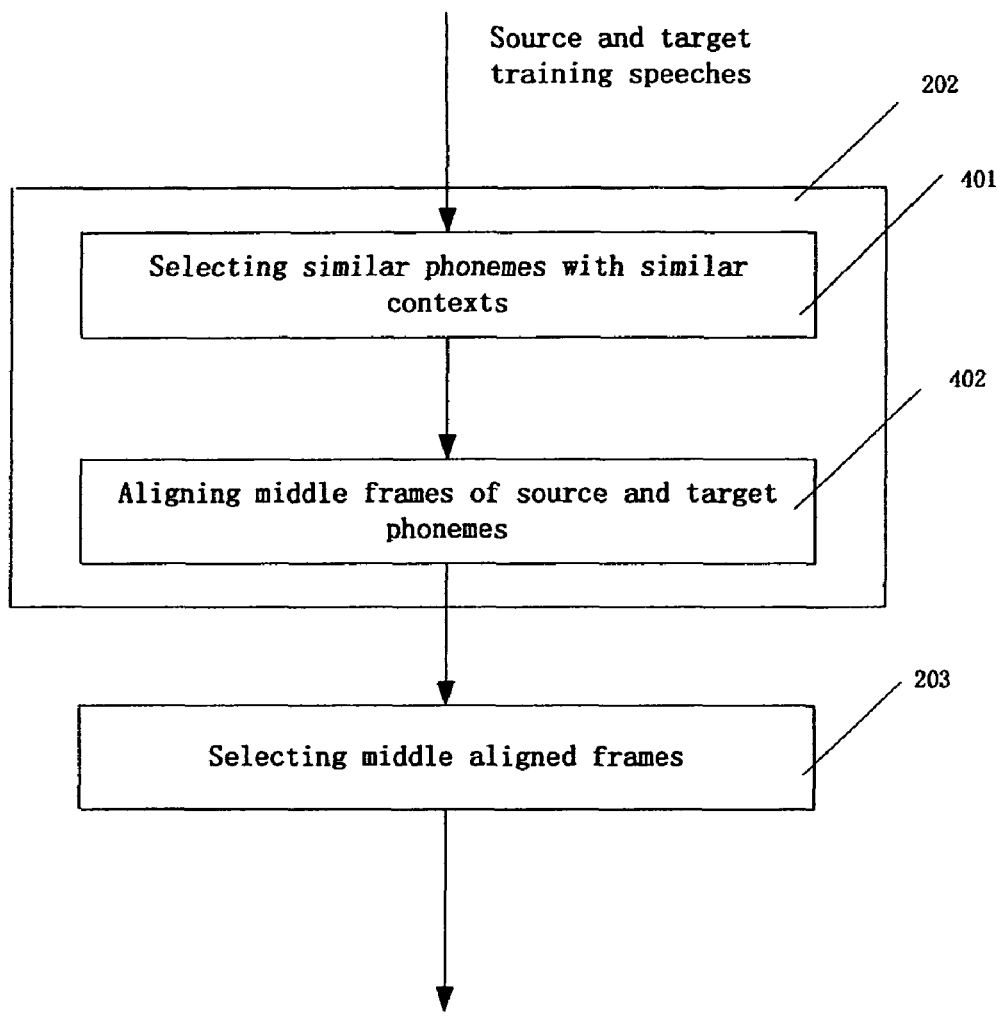
FIG. 4 illustrates a flow diagram of a first embodiment of the method of frame alignment and frame selection of the present invention.

FIG. 4 is a flow diagram illustrating a first embodiment of the method of frame alignment and frame selection of the present invention.

In step 401, a pair of occurrences is selected from the training speech of the source speaker and target speaker, with the pair of occurrences belonging to the same or similar phonemes with the same or similar contexts in the training speech of the source speaker and target speaker. The context as used herein includes but is not limited to: neighboring phonemes, position in the word, position in the phrase, position in the sentence, etc.

If multiple pairs of phonemes with the same or similar contexts are found, some phonemes can be preferred. The formants of some phonemes, such as "e", are deemed to be of less variance, thus the formants of these phonemes can better represent the characteristics of the speaker.

If the found multiple pairs of phonemes with the same or similar contexts are identical with each other, some contexts can be preferred, because in some contexts, the formants of the phoneme are less likely to be affected by neighboring phonemes. For example, in an embodiment of the present invention, the occurrences with "plosives", "fricatives" or "silences" as their neighboring phonemes are selected.

If the found multiple pairs of occurrences with the same or similar contexts have both the same context and the same phoneme with each other, one pair of occurrences will be selected randomly.

After obtaining one pair of aligned occurrences, in step 402, the middle frame of the source speaker' occurrence is aligned with the middle frame of the target speaker's occurrence. The middle frame is deemed to be of less variance, because it is less affected by the formants of the neighboring phonemes. In step 203, the pair of middle frames is selected in order to extract the formant parameters therefrom.

The aligned frames can also be selected from the stable parts of the aligned occurrences where the formants vary slowly in time, in order to extract the formant parameters therefrom.

Figure 5:
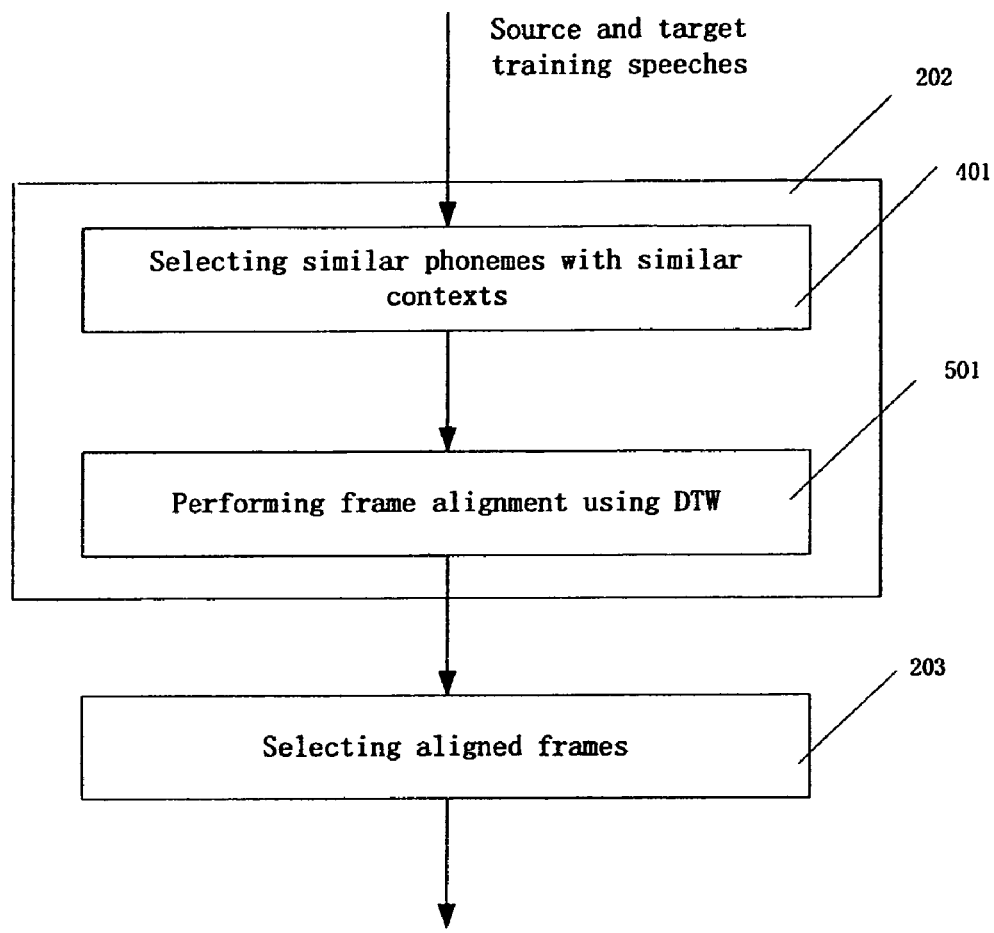
FIG. 5 illustrates a flow diagram of a second embodiment of the method of frame alignment and frame selection of the present invention.

FIG. 5 is a flow diagram illustrating a second embodiment of the frame alignment and frame selection of the present invention. In this second embodiment, when in step 401 a pair of occurrences is obtained in the manner of the above first embodiment, in step 501, the various frames in the occurrence of the target speaker are aligned with the various frames in the occurrence of the source speaker. The alignment can be performed by using the known Dynamic Time Warping (DTW) algorithm. The fundamental point of this method is to find the "best" path through a grid mapping the acoustic features of one pattern to the acoustic features of another pattern. Finding the best path requires solving the minimization problem to evaluate the dissimilarity between two speech patterns. Constraints need to be imposed in order for the result to be meaningful.

Since the DTW method may obtain multiple aligned frames, selection needs to be performed in step 203. One method of selection is based on the positions of the frames in the phoneme. That is, the aligned frames with the source frame located in the middle of the source speaker's occurrence are preferred. The middle frame is deemed to be of less variance, because it is less easily affected by the transition from the neighboring phonemes' formants. Another method of selection is based on the acoustic dissimilarity between the aligned frames. That is, the aligned frames with the minimal acoustic dissimilarity are preferred. These two methods of selection can be performed in combination. Thereafter, the selected aligned frames can be provided to the subsequent steps for generating a frequency warping function of the present invention.

Figure 6:
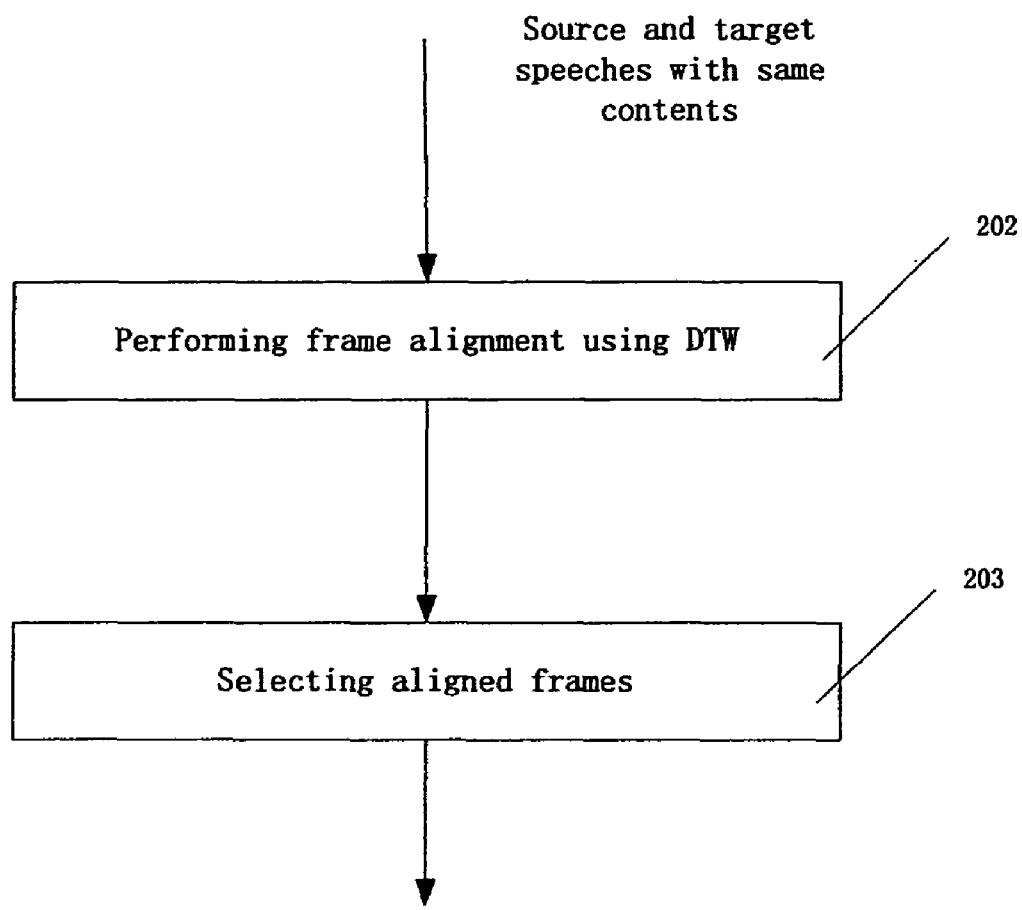
FIG. 6 illustrates a flow diagram of a third and fourth embodiments of the method of frame alignment and frame selection of the present invention.

FIG. 6 is a flow diagram of other embodiments of the methods of frame alignment and frame selection of the present invention. In the illustrated embodiment, it is required in step 201 to prepare the training speech of the same contents uttered by the source speaker and target speaker.

As shown in FIG. 6, in step 202, the speech of the source speaker and the corresponding speech of the target speaker with the same contents are aligned by using the Dynamic Time Warping (DTW) algorithm.

After the alignment operation, many aligned frames are obtained. In step 203, one pair of aligned frames is selected therefrom:

A first selection method is based on the phoneme to which the source frame belongs. Some phonemes, such as "e", are preferred, because the formant parameters of these phonemes are of less variance than those of others. Thus these phonemes can better represent the speaker's characteristics.

A second selection method is based on the context of the source speaker's frame. Some contexts are preferred, because the formants of the phonemes therein are less affected by the neighboring phonemes. For example, in an embodiment of the present invention, the phonemes with "plosives", "fricatives" or "silence" as their neighboring phonemes are selected.

A third selection method is based on the position of the frame in the phoneme. The aligned frames with the source frame located in the middle of the phoneme of the source speaker are preferred. The frame in the middle is deemed as to be of less variance, because it is less easily affected by the transition from the neighboring phonemes' formants.

A fourth selection method is based on the acoustic dissimilarity between the aligned frames. The pair of aligned frames with the minimal acoustic dissimilarity is preferred. The minimal acoustic dissimilarity can be a Euclidean distance or weighted distance between the FFT (Fast Fourier Transform) amplitude spectrums or FFT reciprocal space amplitude spectrums or MFCC (Mel-scale Frequency Cepstral Coefficient) or LPC (Linear Predictive Coding) or LSF (Linear Spectral Frequency) or MCA (Multiple Centroid Analysis) parameters etc. of the aligned frames.

The above four selection methods can also be performed in combination in any manner and order.

Thereafter, the selected aligned frames can be provided to the subsequent steps of the method for generating a frequency warping function of the present invention.

After the speech of the source speaker and the corresponding speech of the target speaker with the same contents have been aligned with the above method by using the Dynamic Time Warping (DTW) algorithm in step 202, in step 203, one pair of frames is selected from the many pairs of frames by using a selection method based on the weighted sum of different costs as follows.

First, the following costs are assigned to each pair of aligned frames:

1) The cost based on the phoneme to which the source frame belongs. Some phonemes are preferred, because some phonemes, such as "e", are of less variance than other phonemes. Thus these phonemes can better represent the characteristics of the speaker. Therefore, a different cost is assigned to each pair of aligned frames based on the different phoneme to which the source frame of the each pair of aligned frames belongs.

2) The cost based on the context of the source frame. Some contexts are preferred, because the formants of phonemes therein are less affected by the neighboring phonemes. For example, in an embodiment of the present invention, the phonemes with "plosives", "fricatives" or "silence" as their neighboring phonemes are selected. Therefore, a different cost is assigned to each pair of aligned frames based on the different context of the source frame of the each pair of aligned frames.

3) The cost based on the position of the phoneme. The aligned frames with the source frame located in the middle of the source speaker's phoneme are preferred. The middle frame is deemed as of less variance, because it is less easily affected by the transition from the neighboring phonemes' formants. Therefore, a different cost is assigned to each pair of aligned frames based on the different position of the source frame of the each pair of aligned frames in the source speaker's phoneme.

4) The cost based on the acoustic dissimilarity of the aligned frames. The pair of aligned frames with the minimal acoustic dissimilarity is preferred. Therefore, a different cost is assigned to each pair of aligned frames based on the acoustic dissimilarity between the each pair of aligned frames.

Then, the weighted sum of the above different costs is calculated for each pair of aligned frames, and the one pair of aligned frames with the minimal weighted sum of costs is selected.

The foregoing describes a method for generating a frequency warping function according to the present invention. In the following, the steps of a method for frequency warping by using the generated frequency warping function according to the present invention will be described with reference to the conversion part of FIG. 2.

Assuming the source speaker's spectrum is S(w), and the frequency warping function from the target frequency axis to the source frequency axis is F(w), the spectrum Conv(w) as converted from the source speaker's spectrum is calculated as:

$$Conv(w)=S(F(w)).$$

In the conversion part of FIG. 2, firstly the spectrum of the source speaker's speech is obtained. Secondly, one or more frequency warping functions are generated by using the above method for generating a frequency warping function according to the present invention. The above two steps can be performed in any order.

Then, the generated one or more frequency warping functions are used to convert the spectrum of the source speaker's speech into a spectrum similar to that of the target speaker's speech.

In an embodiment of the present invention, the same frequency warping function is applied to all occurrences in the speech of the source speaker. Experiments show that the method of this embodiment can successfully convert the source speaker's identity, and at the same time produce a high-quality converted speech, since the frequency warping function generated by the method of the present invention can accurately reflect the difference between the intrinsic characteristics of different speakers. Besides, the method of this embodiment can also avoid the problem of discontinuity generated when different frequency warping functions are applied to different frames.

In another embodiment of the present invention, different frequency warping functions are applied to different occurrences in the speech of the source speaker. This requires a frequency warping function selection method in order to select a different frequency warping function for a particular occurrence. One possible implementation is that in the above method for generating a frequency warping function, different frequency warping functions are generated for different phonemes, thus different frequency warping functions can be applied based on the corresponding phonemes in the speech of the source speaker. Using different frequency warping functions for different phonemes would require using a spectral smoothing technique to avoid the discontinuity at the phoneme boundaries. One of many spectral smoothing techniques in the prior art can be used.

Another possible implementation would be to use vector quantization of the input spectrum to determine the preferred frequency warping function. A variant of this implementation is to use a phoneme-dependent code book for vector quantization.

Thus, using the above steps, the converted spectrum of the source speaker's speech is generated, which is similar to the spectrum of the target speaker as used in the training phase.

The present invention also provides a voice conversion method and a speech recognition method. In the voice conversion method, the converted spectrum as generated in the above method for frequency warping is used to reconstruct a converted speech, thus achieving the conversion of the speaker's identity. The remainder of the voice conversion method is the same as in the prior art, and will not be repeated here.

Similarly, in the speech recognition method, the converted spectrum as generated in the above method for frequency warping is used as an input to the subsequent steps in speech recognition processing, so as to obtain a better recognition effect. The remainder of the speech recognition processing is the same as in the prior art, and will not be repeated here.

In correspondence to the above methods of the present invention, there are also provided apparatuses and systems for implementing the above methods.

Figure 7:
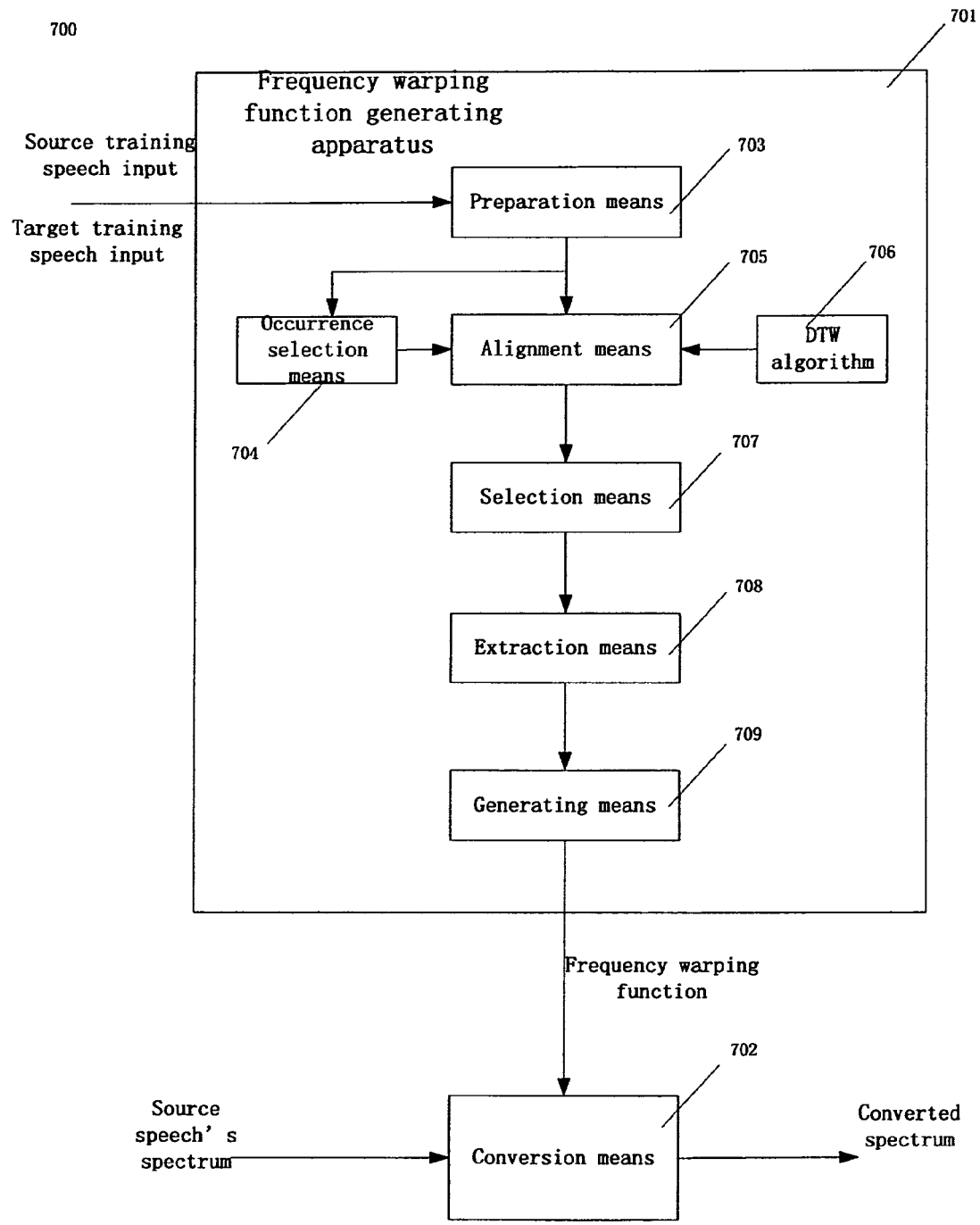
FIG. 7 illustrates a schematic structural block diagram of an apparatus for generating a frequency warping function and an apparatus for frequency warping using the same according to the present invention.

FIG. 7 illustrates a schematic structural block diagram of an apparatus for generating a frequency warping function and an apparatus for frequency warping using the same according to the present invention. As shown, the present invention mainly includes an apparatus 701 for generating a frequency warping function, the apparatus comprising: preparation means 703 for preparing the training speech of the source speaker and target speaker; alignment means 705 for performing frame alignment on the training speech of the source speaker and target speaker; selection means 707 for selecting aligned frames from the frame-aligned training speech of the source speaker and target speaker; extraction means 708 for extracting the corresponding sets of formant parameters from the selected aligned frames; and generating means 709 for generating a frequency warping function based on the corresponding sets of formant parameters. The present invention further includes a frequency warping apparatus 700, the apparatus comprising means for obtaining the source speaker's spectrum (not shown), the above apparatus 701 for generating a frequency warping function, and means 702 for converting the source speaker's spectrum to a spectrum similar to that of the target speaker by using the obtained frequency warping function.

According to an embodiment of the present invention, the extraction means 708 is for extracting formant frequencies from training speech.

According to an embodiment of the present invention, the generating means 709 comprises means for using the various pairs of corresponding formant parameters in the corresponding sets of formant parameters as key positions in a piecewise linear frequency warping function to generate the frequency warping function.

According to an embodiment of the invention, the extracting means 708 further includes using the information of the neighboring frames to make the extracted formant parameters more robust and reliable.

According to an embodiment of the present invention, the extracting means 708 extracts multiple pairs of corresponding sets of formant parameters from multiple selected pairs of aligned frames, and comprises means for calculating the averages of these multiple pairs of corresponding sets of formant parameters by source and target respectively, as the corresponding sets of formant parameters for generating a frequency warping function.

According to an embodiment of the present invention, the extracting means 708 extracts multiple pairs of corresponding sets of formant parameters from multiple selected pairs of aligned frames; and the generating means comprises means for generating a frequency warping function based on each pair of corresponding sets of formant parameters and calculating the average of these frequency warping functions, as said frequency warping function.

According to an embodiment of the present invention, the alignment means 705 comprises: means 704 for selecting corresponding occurrences from the training speech of the source speaker and target speaker; and means for performing frame alignment on the corresponding occurrences.

According to an embodiment of the present invention, the corresponding occurrences are the same or similar phonemes with the same or similar contexts in the training speech of the source speaker and target speaker.

According to an embodiment of the present invention, the same or similar contexts comprise at least one of the same or similar neighboring phonemes, the same or similar positions in the words, the same or similar positions in the phrases, and the same or similar positions in the sentences.

According to an embodiment of the present invention, the means 704 for selecting corresponding occurrences comprises means for, when there are multiple pairs of the same or similar phonemes with the same or similar contexts, and the pairs of the same or similar phonemes are different from each other, selecting the same or similar corresponding phonemes with the formant parameters of less variance, as said corresponding occurrences.

According to an embodiment of the present invention, the means 704 for selecting the corresponding occurrences comprises means for, when there are multiple pairs of the same or similar phonemes with the same or similar contexts, and the pairs of the same or similar phonemes are identical with each other, selecting the same or similar corresponding phonemes with their contexts less affecting their formant parameters, as said corresponding occurrences.

According to an embodiment of the present invention, the same or similar corresponding phonemes with their contexts less affecting their formant parameters include the same or similar corresponding phonemes with "plosives" or "fricatives" or "silence" as their neighboring phonemes.

According to an embodiment of the present invention, the means 707 for selecting aligned frames comprises means for selecting the aligned frames in the middle of the corresponding occurrences.

According to an embodiment of the present invention, the means 707 for selecting aligned frames comprises means for selecting aligned frames from a portion of the corresponding occurrences where the formants vary slowly in time.

According to an embodiment of the present invention, the means for performing frame alignment on the corresponding occurrences comprises means for performing frame alignment by using the Dynamic Time Warping (DTW) algorithm 706.

According to an embodiment of the present invention, the means 707 for selecting aligned frames comprises means for at least one of selecting aligned frames in the middle of corresponding frame-aligned occurrences and selecting aligned frames with the minimal acoustic dissimilarity.

According to an embodiment of the present invention, the preparation means 703 comprises means for preparing the training speech of the source speaker and target speaker with the same contents; and the alignment means 705 comprises means for using the Dynamic Time Warping (DTW) algorithm to perform frame alignment on the training speech of the source speaker and target speaker with the same contents.

According to an embodiment of the present invention, the selection means 707 comprises means for one or more of the following: selecting from the phonemes with the formant parameters of less variance, selecting from the phonemes with their neighboring phonemes less affecting their formant parameters, selecting from the middle portion of the phonemes, and selecting the aligned frames with the minimal acoustic dissimilarity.

According to an embodiment of the present invention, the minimal acoustic dissimilarity between the aligned frames can be a Euclidean distance or weighted distance between the FFT amplitude spectrums or FFT reciprocal space amplitude spectrums or MFCC or LPC or LSF or MCA parameters etc. of the aligned frames.

According to an embodiment of the present invention, the selection means 707 comprises: assignment means for assigning respective costs to each pair of aligned frames in the training speech of the source speaker and target speaker based on the phonemes to which the pair of frames belong, the contexts of the pair of frames, the positions of the pair of frames in their phonemes, the acoustic dissimilarity between the pair of frames, respectively; calculating means for calculating the weighted sum of the respective costs of the each pair of frames to obtain the total cost of the each pair of frames; and selection means for selecting the pair of frames with the minimal total cost as said aligned frames for extracting the corresponding sets of formant parameters.

The voice conversion system according to the present invention comprises the above apparatus 700 for frequency warping in combination with other components known in the voice conversion art.

The speech recognition system according to the present invention comprises the above apparatus 700 for frequency warping in combination with other components known in the speech recognition art.

The foregoing describes a method an apparatus for generating a frequency warping function, a method and apparatus for frequency warping, and a voice conversion system and speech recognition system comprising the apparatus for frequency warping. The above description is only illustrative, intended to enable those skilled in the art to implement the present invention, and not as limitations on the present invention. The various steps in the described methods according to the various embodiments of the present invention may also be performed in a different order, or some steps may be added, deleted, or replaced, without departing from the scope and spirit of the present invention. The various components in the described apparatuses and systems according to the various embodiments of the present invention can be implemented as software, firmware, hardware, or any combination thereof, and these components can be split or combined, provided the functions can be realized. In a preferred implementation, these apparatuses are a combination of general purpose computer hardware and the corresponding software functional modules. The claimed scope of invention is not defined by the above description, but uniquely defined by the following claims.

The invention claimed is:

1. A method for generating a frequency warping function, comprising:
operating at least one programmed processor to carry outs acts of:
identifying occurrences of at least one pair of a phoneme and a context for the phoneme present in training speech for both a source speaker and a target speaker;
performing frame alignment on audio data of the training speech for the source speaker and audio data of the training speech for the target speaker corresponding to the occurrences;
selecting selected frames from the audio data of the training speech for the source speaker and the audio data of the training speech for the target speaker corresponding to the occurrences;
extracting corresponding sets of formant parameters from the selected frames, the extracting comprising:
extracting, from one or more first selected frames of the audio data of the training speech for the source speaker that comprise audio of a first phoneme in a first context, a first set of one or more formant parameters of the source speaker for the first phoneme in the first context,
extracting, from one or more second selected frames of the audio data of the training speech for the target speaker that comprise audio of the first phoneme in the first context, a second set of one or more formant parameters of the target speaker for the first phoneme in the first context, extracting, from one or more third selected frames of the audio data of the training speech for the source speaker that comprise audio of the first phoneme in a second context, a third set of one or more formant parameters of the source speaker for the first phoneme in the second context, and extracting, from one or more fourth selected frames of the audio data of the training speech for the target speaker that comprise audio of the first phoneme in the second context, a fourth set of one or more formant parameters of the target speaker for the first phoneme in the second context; and generating a frequency warping function based on the corresponding sets of formant parameters, wherein generating the frequency warping function comprises:

calculating a first relationship between the first set of one or more formant parameters and the second set of one or more formant parameters, and calculating a second relationship between the third set of one or more formant parameters and the fourth set of one or more formant parameters.

2. The method of claim 1, wherein the formant parameters comprises formant frequencies.

3. The method of claim 1, wherein the generating a frequency warping function comprises using various pairs of corresponding formant parameters in the corresponding sets of formant parameters as key positions in a piecewise linear frequency warping function to generate the frequency warping function.

4. The method of claim 1, wherein the extracting the first set of one or more formant parameters comprises:

extracting multiple sets of one or more formant parameters from multiple selected frames of the audio data of the training speech for the source speaker that comprise audio of the first phoneme in the first context, and deriving the averages of these multiple sets of one or more formant parameters as the first set of one or more formant parameters.

5. The method of claim 1, wherein the extracting the corresponding sets of formant parameters comprises extracting multiple pairs of corresponding formant parameters from multiple selected pairs of frames; and the generating a frequency warping function comprises generating a frequency warping function based on each pair of corresponding sets of formant parameters, and calculating the average of these frequency warping functions as said frequency warping function.

6. The method of claim 1, wherein identifying the occurrences in the training speech of the source speaker and target speaker comprises identifying occurrences of at least one pair of a same or similar phoneme and a same or similar context for the phoneme in the training speech of the source speaker and target speaker.

7. The method of claim 6, wherein the same or similar contexts comprise at least one of the same or similar neighboring phonemes, the same or similar positions in the words, the same or similar positions in the phrases, and the same or similar positions in the sentences.

8. The method of claim 6, wherein the identifying the occurrences comprises: when there are multiple pairs of the same or similar phonemes with the same or similar contexts, and the pairs of the same or similar phonemes are different from each other, selecting the same or similar corresponding phonemes with the formant parameters of less variance, as said occurrences.

9. The method of claim 6, wherein the identifying the occurrences comprises: when there are multiple pairs of the same or similar phonemes with the same or similar contexts, and the pairs of the same or similar phonemes are identical with each other, selecting the same or similar corresponding phonemes with "plosives" or "fricatives" or "silence" as their neighboring phonemes, as said occurrences.

10. The method of claim 6, wherein the selecting frames comprises selecting frames in the middle of the occurrences.

11. The method of claim 6, wherein the performing frame alignment on the occurrences comprises using the Dynamic Time Warping (DTW) algorithm to perform frame alignment.

12. The method of claim 11, wherein the selecting frames comprises at least one of selecting frames in the middle of corresponding frame-aligned occurrences, and selecting frames with the minimal acoustic dissimilarity.

13. The method of claim 1, wherein the operating further comprises operating the at least one processor to carry out preparing the training speech of the source speaker and target speaker with the same contents; and wherein the performing frame alignment comprises using the Dynamic Time Warping (DTW) algorithm to perform frame alignment on the training speech of the source speaker and target speaker with the same contents.

14. The method of claim 13, wherein the selecting frames comprises one or more of the following: selecting from the phonemes with the formant parameters of less variance, selecting from the phonemes with "plosives", "fricatives" or "silence" as their neighboring phonemes, selecting from the middle portion of the phonemes, and selecting the frames with the minimal acoustic dissimilarity.

15. The method of claim 14, wherein the selecting aligned frames comprises:

assigning respective costs to each pair of first frames in the training speech of the source speaker and target speaker based on the phonemes to which the pair of first frames belong, the contexts of the pair of first frames, the positions of the pair of first frames in their phonemes, and the acoustic dissimilarity between the pair of first frames, respectively;

calculating a weighted sum of respective costs of each pair of first frames to obtain a total cost of the each pair of first frames; and selecting a pair of first frames with the minimal total cost as said frames for extracting the corresponding sets of formant parameters.

16. The method of claim 13, wherein selecting frames comprises selecting frames with minimal acoustic dissimilarity between the frames, and wherein selecting the frames with minimal acoustic dissimilarity between the frames comprises applying at least one of Euclidean distance and weighted distance between at least one of FFT amplitude spectrums, FFT reciprocal space amplitude spectrums, MFCC, LPC, LSF and MCA parameters of the frames.

17. The method of claim 1, wherein the operating further comprises operating the at least one processor to carry out:

obtaining the spectrum of a source speaker's speech; and converting the spectrum of the source speaker's speech using the frequency warping function.

18. The method of claim 17, wherein converting the spectrum of the source speaker's speech using the frequency warping function comprises converting the source speaker's speech into speech similar to speech of the target speaker.

19. The method of claim 1, wherein:
identifying the occurrences of the at least one pair of a phoneme and a context for the phoneme present in the training speech of the source speaker and the target speaker comprises identifying the occurrences in training speech of the source speaker that has first content and training speech of the target speaker that has second content, wherein the first content is different from the second content, and
generating the frequency warping function based on the corresponding sets of formant parameters comprises generating the frequency warping function based on corresponding sets of formant parameters extracted from audio data of the training speech for the source speaker and the training speech for the target speaker.

20. The method of claim 1, wherein generating the frequency warping function comprises:
generating a first frequency warping function to warp the first phoneme in the first context, and
generating a second frequency warping function to warp the first phoneme in the second context.

21. The method of claim 1, wherein generating the frequency warping function comprises generating a frequency warping function that warps the first phoneme in the first context in a first manner and warps the first phone in the second context in a second manner.

22. An apparatus for generating a frequency warping function, comprising:
means for identifying occurrences of at least one pair of a phoneme and a context for the phoneme present in training speech for both a source speaker and a target speaker;
alignment means for performing frame alignment on audio data of the training speech for the source speaker and audio data of the training speech for the target speaker corresponding to the occurrences;
selection means for selecting selected frames from the audio data of the training speech for the source speaker and the audio data of the training speech for the target speaker;
extraction means for extracting corresponding sets of formant parameters from the selected frames, the extracting comprising:
extracting, from one or more first selected frames of the audio data of the training speech for the source speaker that comprise audio of a first phoneme in a first context, a first set of one or more formant parameters of the source speaker for the first phoneme in the first context,
extracting, from one or more second selected frames of the audio data of the training speech for the target speaker that comprise audio of the first phoneme in the first context, a second set of one or more formant parameters of the target speaker for the first phoneme in the first context,
extracting, from one or more third selected frames of the audio data of the training speech for the source speaker that comprise audio of the first phoneme in a second context, a third set of one or more formant parameters of the source speaker for the first phoneme in the second context, and
extracting, from one or more fourth selected frames of the audio data of the training speech for the target speaker that comprise audio of to the first phoneme in the second context, a fourth set of one or more formant parameters of the target speaker for the first phoneme in the second context; and
generating means for generating a frequency warping function based on the corresponding sets of formant parameters, wherein generating the frequency warping function comprises:
calculating a first relationship between the first set of one or more formant parameters and the second set of one or more formant parameters, and
calculating a second relationship between the third set of one or more formant parameters and the fourth set of one or more formant parameters.

23. The apparatus of claim 22, wherein the alignment means comprises:
means for selecting first occurrences from the training speech of the source speaker and target speaker; and
means for performing frame alignment on the first occurrences.

24. The apparatus of claim 22, further comprising:
means for preparing the training speech of the source speaker and target speaker with the same contents; and
wherein the alignment means comprises means for applying a Dynamic Time Warping (DTW) algorithm to perform frame alignment on the training speech of the source speaker and target speaker with the same contents.

25. The apparatus of claim 22, wherein the selection means comprises:
assignment means for assigning respective costs to each pair of first frames in the training speech of the source speaker and target speaker based on the phonemes to which the pair of first frames belongs, the contexts of the pair of first frames, the positions of the pair of first frames in their phonemes, and the acoustic dissimilarity between the pair of first frames, respectively;
calculating means for calculating the weighted sum of the respective costs of the each pair of first frames to obtain the total cost of the each pair of first frames; and
selection means for selecting the pair of first frames with the minimal total cost as said frames for extracting the corresponding sets of formant parameters.

26. The apparatus for frequency warping of claim 22, further comprising:
means for obtaining the spectrum of a source speaker's speech; and
means for converting the spectrum of the source speaker's speech using the frequency warping function.

27. An apparatus for generating a frequency warping function, the apparatus comprising:
at least one processor programmed to:
identify occurrences of at least one pair of a phoneme and a context for the phoneme present in training speech for both a source speaker and a target speaker;
perform frame alignment on audio data of the training speech for the source speaker and audio data of the training speech for the target speaker corresponding to the occurrences;
select selected frames from the training speech of the audio data of the source speaker and the audio data of the training speech for the target speaker;
extract corresponding sets of formant parameters from the selected frames, wherein the at least one processor is programmed to extract at least in part by:
extracting, from one or more first selected frames of the audio data of the training speech for the source speaker that comprise audio of a first phoneme in a first context, a first set of one or more formant parameters of the source speaker for the first phoneme in the first context, extracting, from one or more second selected frames of the audio data of the training speech for the target speaker that comprise audio of the first phoneme in the first context, a second set of one or more formant parameters of the target speaker for the first phoneme in the first context, extracting, from one or more third selected frames of the audio data of the training speech for the source speaker that comprise audio of the first phoneme in a second context, a third set of one or more formant parameters of the source speaker for the first phoneme in the second context, and extracting, from one or more fourth selected frames of the audio data of the training speech for the target speaker that comprise audio of to the first phoneme in the second context, a fourth set of one or more formant parameters of the target speaker for the first phoneme in the second context; and generate a frequency warping function based on the corresponding sets of formant parameters, wherein the at least one processor is programmed to generate the frequency warping function at least in part by:

calculating a first relationship between the first set of one or more formant parameters and the second set of one or more formant parameters, and calculating a second relationship between the third set of one or more formant parameters and the fourth set of one or more formant parameters.

28. The apparatus of claim 27, wherein the at least one processor is programmed to select the frames by selecting occurrences from the training speech of the source speaker and target speaker.

29. The apparatus of claim 27, wherein the at least one processor is programmed to align by applying a Dynamic Time Warping (DTW) algorithm to perform frame alignment on the training speech of the source speaker and target speaker with the same contents.

30. The apparatus of claim 27, wherein the at least one processor is programmed to select by:

assigning respective costs to each pair of first frames in the training speech of the source speaker and target speaker based on the phonemes to which the pair of first frames belongs, the contexts of the pair of first frames, the positions of the pair of first frames in their phonemes, and the acoustic dissimilarity between the pair of first frames, respectively;

calculating the weighted sum of the respective costs of the each pair of first frames to obtain the total cost of the each pair of first frames; and selecting the pair of first frames with the minimal total cost as said frames for extracting the corresponding sets of formant parameters.

31. The apparatus for frequency warping of claim 27, wherein the at least one processor is further programmed to:

obtain the spectrum of a source speaker's speech; and convert the spectrum of the source speaker's speech using the frequency warping function.

* * * * *